United States Patent
Oda

(10) Patent No.: US 6,812,740 B2
(45) Date of Patent: Nov. 2, 2004

(54) LOW-VOLTAGE DRIVE CIRCUIT AND METHOD FOR THE SAME

(75) Inventor: Yasuo Oda, Saitama (JP)

(73) Assignee: Wacom Co., Ltd., Saitama-Ken (JP)

( * ) Notice: Subject to any disclaimer, the term of this patent is extended or adjusted under 35 U.S.C. 154(b) by 106 days.

(21) Appl. No.: 10/338,695

(22) Filed: Jan. 9, 2003

(65) Prior Publication Data

US 2003/0169074 A1 Sep. 11, 2003

(30) Foreign Application Priority Data

Jan. 9, 2002 (JP) ....................................... 2002-001957

(51) Int. Cl.$^7$ ......................................... H03K 19/0175
(52) U.S. Cl. .............................. 326/82; 326/33; 326/90
(58) Field of Search ............................. 326/31, 33, 34, 326/82, 86, 90; 327/108, 110, 111

(56) References Cited

U.S. PATENT DOCUMENTS 4,736,082 A * 4/1988 Matsuo et al. .............. 219/626
5,248,866 A * 9/1993 Tanaka et al. ............... 219/624

* cited by examiner

Primary Examiner—Anh Q. Tran
(74) Attorney, Agent, or Firm—Liniak, Berenato & White, LLC

(57) ABSTRACT

A low-voltage drive circuit for driving a sensor coil in a coordinate input device at a constant current includes a DC coupling capacitor and a constant-current output bias circuit unit. The DC coupling capacitor is provided between an output of a constant-current output drive circuit unit and a sensor coil. The constant-current output bias circuit unit controls a DC bias voltage of the output of the constant-current output drive circuit unit to be a midpoint potential of an operating voltage range for the constant-current output drive circuit unit. The constant-current output drive circuit unit may include a drive source circuit segment and a drive sink circuit segment that function as a complementary constant-current circuit unit. Preferably, the drive source circuit segment and the drive sink circuit segment are connected to respective constant-current output bias circuit units.

16 Claims, 3 Drawing Sheets

LOW-VOLTAGE DRIVE CIRCUIT AND METHOD FOR THE SAME

CLAIM TO PRIORITY

Applicant hereby claims priority under 35 U.S.C. §119 to Japanese Application No. 2002-001957, filed Jan. 9, 2002, titled Low-Voltage Drive Circuit and Method for the Same, the disclosure of which is incorporated herein by reference.

FIELD OF THE INVENTION

The present invention relates to circuits for electromagnetic-induction pointing devices, and more specifically, to a low-voltage drive circuit for driving a sensor coil in an electromagnetic-induction coordinate input device at a constant current.

BACKGROUND OF THE INVENTION

For discharging a current to a sensor coil using a single power supply in low-voltage drive circuits in conventional electromagnetic-induction coordinate pointing devices, a common potential of sensor coils must be shifted to a midpoint potential. A reference circuit with low impedance is required to avoid noise. Such reference circuits have a complex circuit design. Furthermore, such reference circuits do not efficiently. utilize electric power. The drive circuits also include a complementary constant-current circuit unit, which has a drive source circuit segment and a drive sink circuit segment. Each of the segments requires a bias voltage of approximately 1 V. If a single 3 V power supply is used, sufficient drive voltage of the sensor coils is not achieved.

A conventional low-voltage drive circuit for driving a sensor coil in an electromagnetic-induction coordinate input device at a constant current is best shown in FIG. 3. An AC signal is input to an input terminal IN5. A PNP transistor Tr20 and a differential amplifier 30 are each connected to a power supply Vcc with a resistor R20 therebetween. The PNP transistor Tr20 and the differential amplifier 30 function as a drive source circuit segment. Based on the input AC signal, the differential amplifier 30 and the PNP transistor Tr20 output a constant-current AC signal to one end of a sensor coil 10. Also, an AC signal is input to an input terminal IN6. An NPN transistor Tr21 and a differential amplifier 32 are each connected to ground with a resistor R21 therebetween. The NPN transistor Tr21 and the differential amplifier 32 function as a drive sink circuit segment. Based on the input AC signal, the differential amplifier 32 and the NPN transistor Tr21 output a constant-current AC signal to one end of the sensor coil 10. The PNP transistor Tr20 and the NPN transistor Tr21 are complementarily connected to each other, and combine the constant-current AC signals corresponding to the signals input from the input terminals IN5 and IN6 into one signal, which is then output.

The other end of the sensor coil 10 is connected to a reference circuit unit 34, so that a common potential of the sensor coil 10 is shifted to a midpoint potential. Also, the other end of the sensor coil 10 is grounded with a capacitor C20 therebetween. The reference circuit unit 34 is needed for AC driving the sensor coil 10. Thus, the size of the circuit is increased, and thus current consumption in the circuit increases.

When the sensor coil 10 is AC driven, the midpoint of the sensor coil 10 has half the voltage of the power supply Vcc by using the reference circuit 34, thus restricting a drive voltage range.

SUMMARY OF THE INVENTION

Accordingly, it is an object of the present invention to provide a drive circuit that reduces the size of the overall drive circuit, thereby reducing current consumption by driving a sensor coil at a constant current without using a reference circuit. The drive circuit has a wide driving voltage range by biasing a drive source circuit segment and a drive sink circuit segment separately.

A low-voltage drive circuit for driving a sensor coil in a coordinate input device at a constant current comprises: a constant-current output drive circuit unit; a DC coupling capacitor provided between an output of the constant-current output drive circuit unit and the sensor coil; and a constant-current output bias circuit unit for controlling a DC bias voltage of the output of the constant-current output drive circuit unit to be a midpoint potential of an operating voltage range for the constant-current output drive circuit unit. The midpoint potential is a target value of control. The vicinity of the midpoint potential, as a result of control, is also regarded as the midpoint potential, wherein the vicinity range is determined by a conventional method well known in the art. (The same applies to the following embodiments of the present invention.) The constant-current output drive circuit unit preferably includes a drive source circuit segment and a drive sink circuit segment, which function as a complementary constant-current circuit unit.

In a low-voltage drive circuit for driving a sensor coil in a coordinate input device at a constant current according to a second embodiment of the present invention, a constant-current output drive source circuit segment and a constant-current output drive sink circuit segment function as a complementary constant-current circuit unit. An output of the drive source circuit segment is connected to the sensor coil with a first DC coupling capacitor therebetween. An output of the drive sink circuit segment is connected to the sensor coil with a second DC coupling capacitor therebetween. The output of the drive source circuit segment is connected to a first constant-current output bias circuit unit, and the output of the drive sink circuit segment is connected to a second constant-current output bias circuit unit. The first and second constant-current output bias circuit units control DC bias voltages of the outputs of the drive source circuit segment and drive sink circuit segment, respectively, to be midpoint potentials of the respective operating voltage ranges of the drive source circuit segment and the drive sink circuit segment.

The first constant-current output bias circuit unit mentioned above may include a differential amplifier, a power supply, an amplifier, a resistor, a capacitor, and an NPN transistor (a bipolar transistor), or an FET or the like which corresponds to the bipolar transistor. In the drive source circuit segment, for example, a differential amplifier and a PNP transistor (a bipolar transistor) or an FET or the like which corresponds to the bipolar transistor convert an input AC signal to a constant-current AC signal that drives the sensor coil at a constant current via the DC coupling capacitor.

The second constant-current output bias circuit unit may include a differential amplifier, a power supply, an amplifier, a resistor, a capacitor, and a PNP transistor (a bipolar transistor), or an FET or the like which corresponds to the bipolar transistor. In the drive sink circuit segment, a differential amplifier and an NPN transistor (a bipolar transistor), or an FET or the like which corresponds to the bipolar transistor, may convert an input AC signal to a constant-current AC signal that drives the sensor coil at a constant current via the DC coupling capacitor.

A low-voltage drive method for driving a sensor coil in a coordinate input device at a constant current comprises the following steps: providing a constant-current output drive circuit unit; connecting a DC coupling capacitor between an output of the constant-current output drive circuit unit and the sensor coil; and controlling a DC bias voltage of the output of the constant-current output drive circuit unit to be a midpoint potential of an operating voltage range for the constant-current output drive circuit unit by a constant-current output bias circuit unit.

A low-voltage drive method for driving a sensor coil in a coordinate input device at a constant current according to the second embodiment of the present invention includes the steps of providing a constant-current output drive source circuit segment; connecting a first DC coupling capacitor between an output of the drive source circuit segment and the sensor coil; controlling a DC bias voltage of the output of the drive source circuit segment to be a midpoint potential of an operating voltage range for the drive source circuit segment by a first constant-current output bias circuit unit; providing a constant-current output drive sink circuit segment, the drive sink circuit segment functioning as a complementary constant-current circuit unit together with the drive source circuit segment; connecting a second DC coupling capacitor between an output of the drive sink circuit segment and the sensor coil; and controlling a DC bias voltage of the output of the drive sink circuit segment to be a midpoint potential of an operating voltage range for the drive sink circuit segment by a second constant-current output bias circuit unit.

The constant-current output bias circuit unit is connected to the output of the drive circuit unit. A bias voltage can thereby be maintained at a midpoint potential of a voltage range in which the drive circuit unit can be driven, even if the coupling capacitor is provided between the drive circuit unit and the sensor coil. Consequently, the sensor coil can be driven at a constant current without a reference circuit, thus reducing the size of the circuit. Thus, the current consumption in the circuit may be reduced.

In particular, in the second embodiment of the present invention, the drive source circuit segment and the drive sink circuit segment are connected to respective constant-current output bias circuit units, thereby allowing drive voltage ranges to be extended.

DETAILED DESCRIPTION OF THE INVENTION

Figure 1:
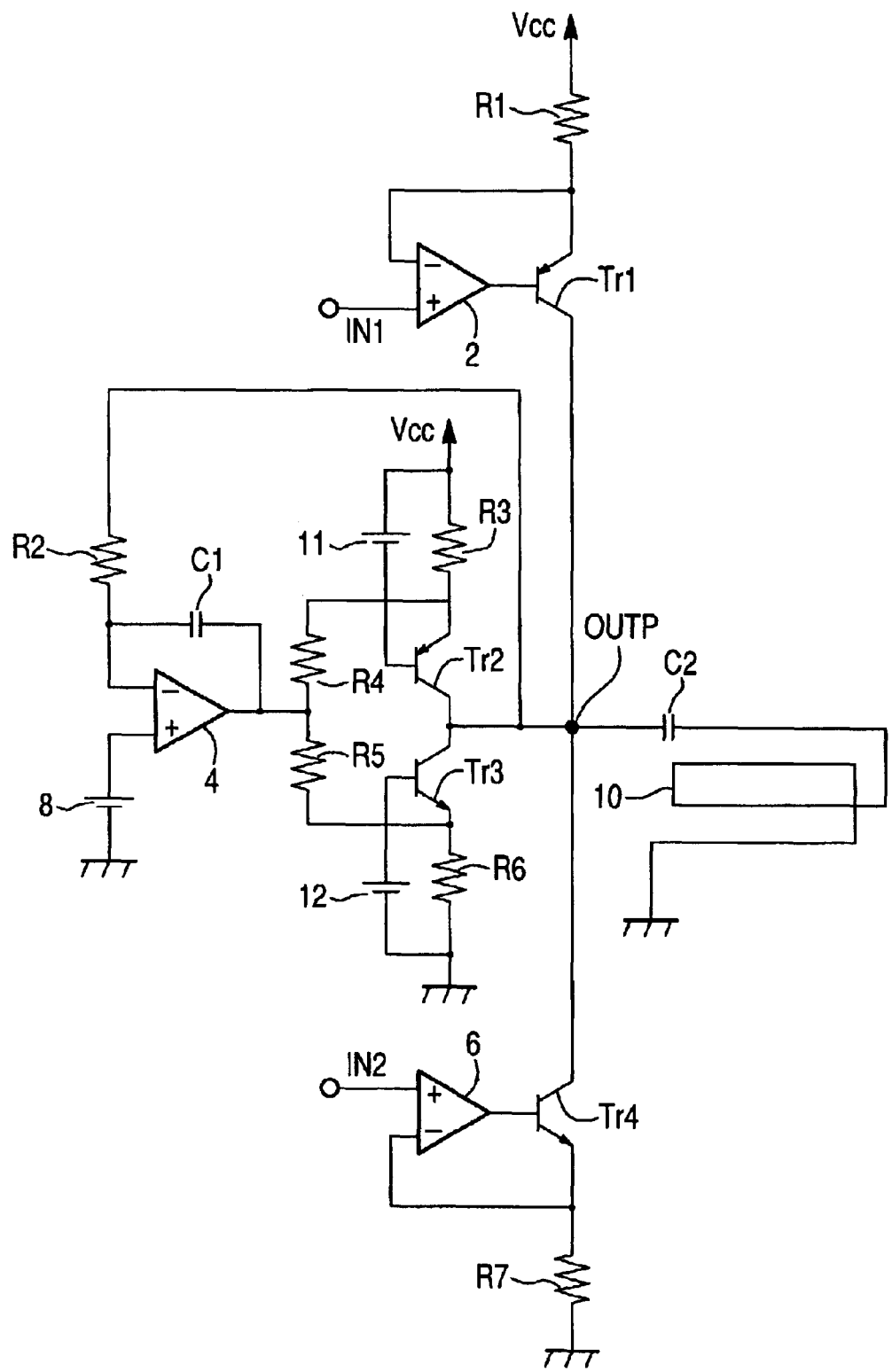
FIG. 1 is a circuit diagram of a low-voltage drive circuit for driving a sensor coil at a constant current according to a first embodiment of the present invention.

A circuit diagram of a low-voltage drive circuit for driving a sensor coil in a coordinate input device at a constant current according to a first embodiment is best shown in FIG. 1. An AC signal is input to an input terminal IN1. A PNP transistor Tr1 and a differential amplifier 2 are each connected to a power supply Vcc with a resistor R1 therebetween. The PNP transistor Tr1 and the differential amplifier 2 function as a constant-current output drive source circuit segment. The collector of the PNP transistor Tr1 is connected to one end of a sensor coil 10 with a DC coupling capacitor C2 therebetween. The DC coupling capacitor C2 is thus connected between the output of the drive source circuit segment and the sensor coil 10. The other end of the sensor coil 10 is grounded. Based on the input AC signal, the drive source circuit segment outputs a constant-current AC signal that drives the sensor coil 10 via the DC coupling capacitor C2.

Also, an AC signal is input to an input terminal IN2. An NPN transistor Tr4 and a differential amplifier 6 are each connected to ground with a resistor R7 therebetween. The NPN transistor Tr4 and the differential amplifier 6 function as a constant-current output drive sink circuit segment. The collector of the NPN transistor Tr4 is also connected to one end of the sensor coil 10 with the DC coupling capacitor C2 therebetween. The DC coupling capacitor C2 is thus connected between the output of the drive sink circuit segment and the sensor coil 10. As described above, the other end of the sensor coil 10 is grounded. Based on the input AC signal, the drive sink circuit segment outputs a constant-current AC signal that drives the sensor coil 10 via the DC coupling capacitor C2.

The PNP transistor Tr1 and the NPN transistor Tr4 function as a complementary constant-current circuit unit. The complementary constant-current circuit unit combines the above constant-current AC signals corresponding to the signals input from the input terminals IN1 and IN2 into one signal, which is then output.

The combined signal output from the PNP transistor Tr1 and the NPN transistor Tr4 is also input to a differential amplifier 4 via the resistor R2. The differential amplifier 4 functions as an integration circuit segment with a capacitor C1 provided between one of input terminals and the output terminal. The other input terminal of the differential amplifier 4 is connected to a power supply 8, which outputs a reference voltage that is half the voltage of the power supply Vcc. The output terminal of the differential amplifier 4 is connected to the emitter of the PNP transistor Tr2 with a resistor R4 therebetween.

The emitter of the PNP transistor Tr2 is also connected to the power supply Vcc with a resistor R3 therebetween. A bias voltage is applied to the base of the PNP transistor Tr2 from a power supply 11. The output terminal of the differential amplifier 4 is also connected to the emitter of an NPN transistor Tr3 with a resistor R5 therebetween. The emitter of the NPN transistor Tr3 is connected to ground with a resistor R6 therebetween. A bias voltage is applied to the base of the NPN transistor Tr3 from a power supply 12. The differential amplifier 4, the PNP transistor Tr2, the NPN transistor Tr3, the resistors R2, R3, R4, R5, and R6, the capacitor C1, and the power supplies 8, 11 and 12 function as a constant-current output bias circuit unit. A DC bias voltage is thus applied to a common output OUTP of the drive source circuit segment and the drive sink circuit segment.

An operation for providing a DC bias voltage will now be described. If the voltage of the OUTP is above (or below) that of the power supply 8, a current flows from the resistor R2 to the input of the differential amplifier 4 (or flows from the input of the differential amplifier 4). The current is stored in the capacitor C1, and the output voltage of the differential amplifier 4 gradually decreases (or increases). Then, the current in the resistor R4 increases (or decreases) and the current in the resistor R5 decreases (or increases). Therefore, emitter and collector currents of the PNP transistor Tr2 decrease (or increase), and emitter and collector currents of the NPN transistor Tr3 increase (or decrease). Consequently, a combined current of the collectors of the PNP transistor Tr2 and the NPN transistor Tr3 becomes a sink or source current, and flows into the DC coupling capacitor C2. As a result, the voltage of the OUTP, which is the common output of the drive circuit segments, gradually decreases (or increases) to the voltage of the power supply 8.

Since the average current of the output of the drive circuit segments is not zero, the bias point deviates from a midpoint. Therefore, a DC bias voltage is applied to the midpoint in which the response characteristic of the DC bias voltage is sufficiently lower than the frequency of the output current. Accordingly, the constant-current output bias circuit unit is connected to the output of the drive circuit segments. Moreover, the DC coupling capacitor C2 provided between the output of the drive circuit segments and the sensor coil 10 allows an AC signal to be transmitted to the sensor coil 10. If an analog switch is provided between the output of the drive circuit segments and the sensor coil 10, a negative power supply is preferably used in order to control the analog switch.

Figure 2:
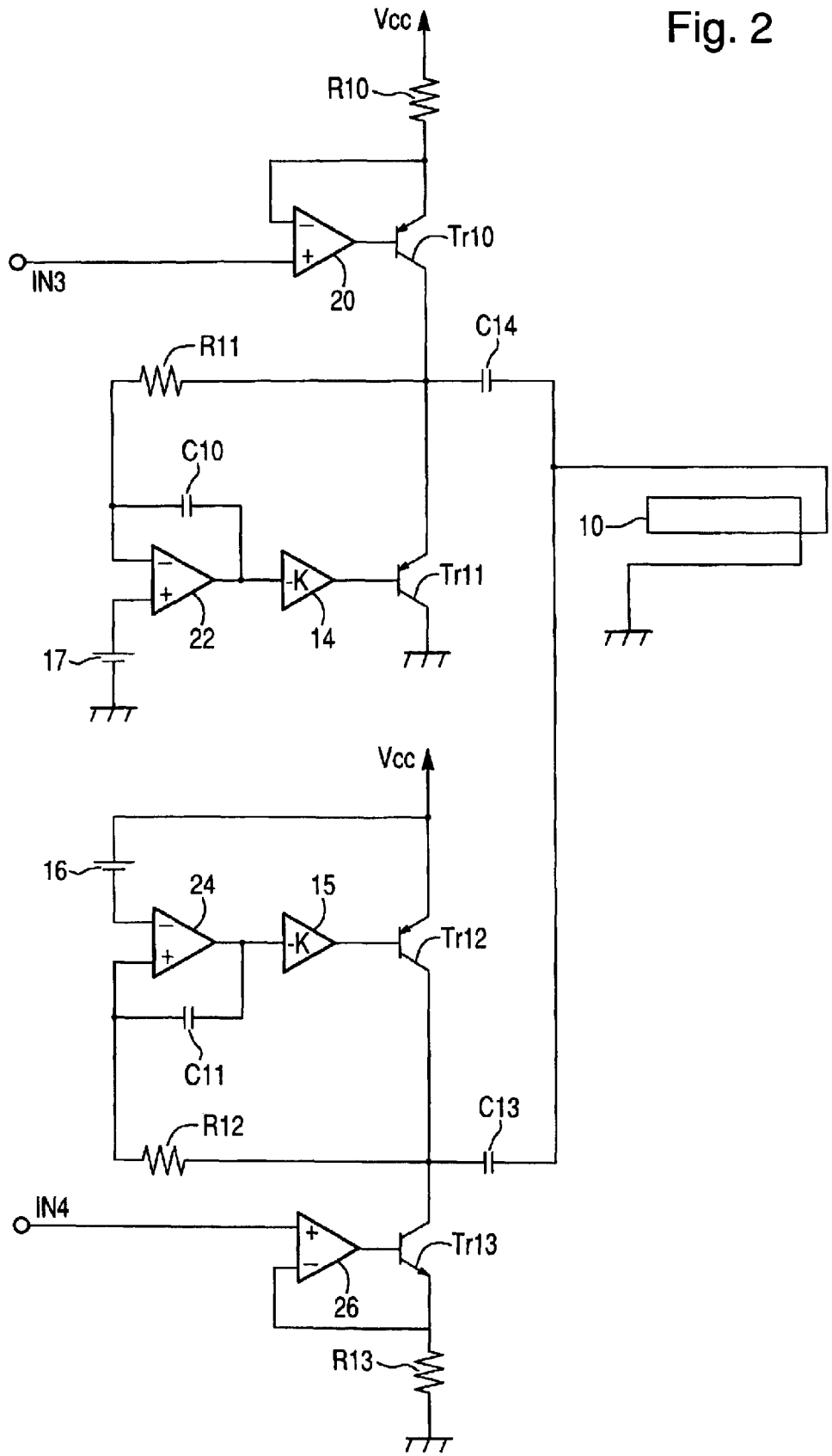
FIG. 2 is a circuit diagram of a low-voltage drive circuit for driving a sensor coil at a constant current according to a second embodiment.
Figure 3:
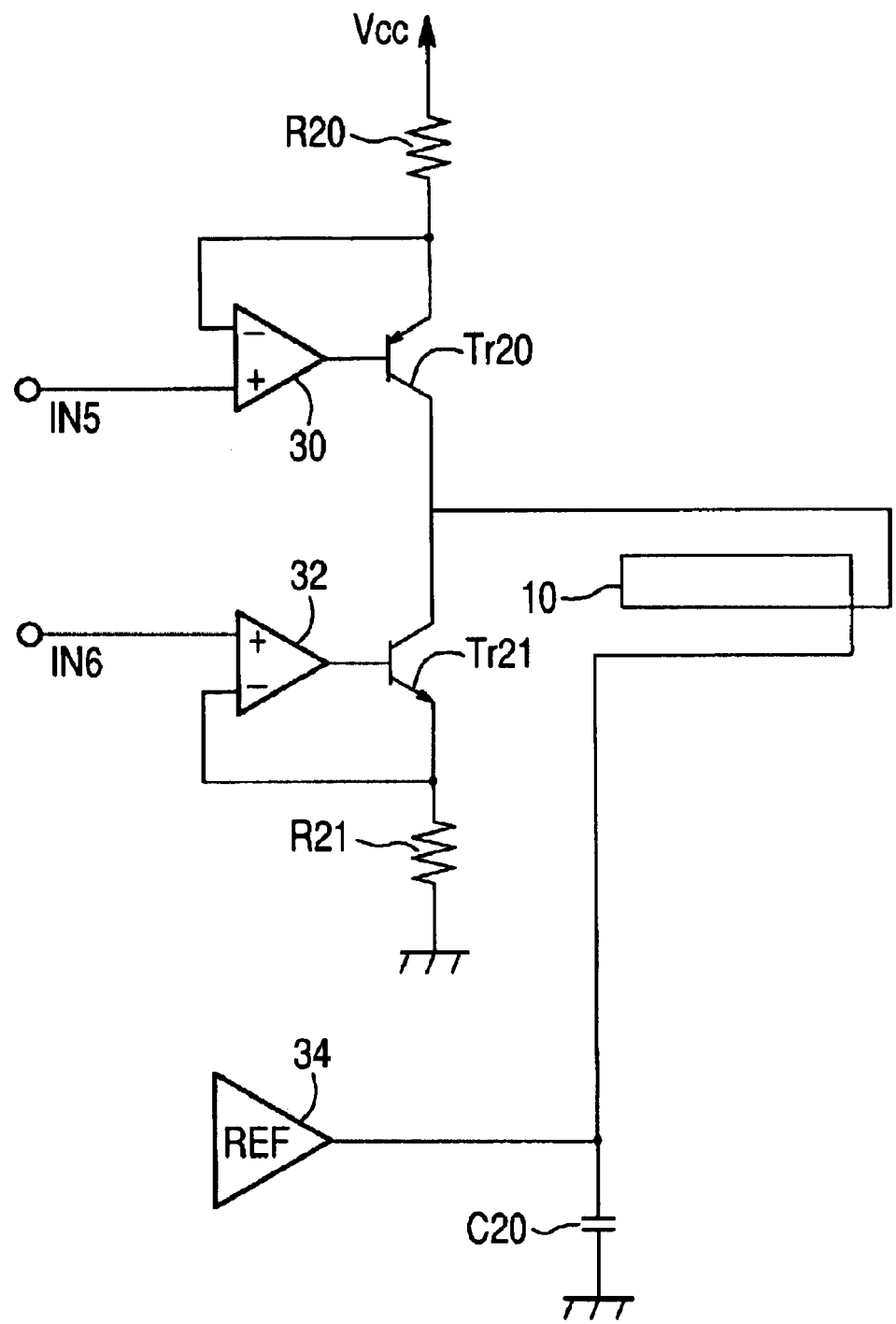
FIG. 3 is a circuit diagram of a conventional low-voltage drive circuit for driving a sensor coil in an electromagnetic-induction coordinate input device at a constant current.

A circuit diagram of a low-voltage drive circuit for driving a sensor coil in a coordinate input device at a constant current according to a second embodiment is best shown in FIG. 2. An AC signal is input to an input terminal IN3. A PNP transistor Tr10 and a differential amplifier 20 are each connected to a power supply Vcc with a resistor R10 therebetween. The PNP transistor Tr10 and the differential amplifier 20 function as a drive source circuit segment. Based on the input AC signal, the differential amplifier 20 and the PNP transistor Tr10 produce a constant-current AC signal that drives a sensor coil 10 via a DC coupling capacitor C14.

Also, an AC signal is input to an input terminal IN4. An NPN transistor Tr13 and a differential amplifier 26 are each connected to ground with a resistor R13 therebetween. The NPN transistor Tr13 and the differential amplifier 26 function as a drive sink circuit segment. Based on the input AC signal, the differential amplifier 26 and the NPN transistor Tr13 produce a constant-current AC signal that drives the sensor coil 10 via a DC coupling capacitor C13. The PNP transistor Tr10 and the NPN transistor Tr13 with the DC coupling capacitors C13 and C14 therebetween function as a complementary constant-current circuit unit. The complementary constant-current circuit unit combines the above constant-current AC signals corresponding to the signals input from the input terminals IN3 and IN4 into one signal, which is output to the sensor coil 10.

In the second embodiment, if each power supply Vcc outputs a voltage of +3 V, the sum of the voltage across the resistor R10 and the voltage between the emitter and collector of the PNP transistor Tr10, and the sum of the voltage between the collector and emitter of the NPN transistor Tr13 and the voltage across the resistor R13, must be 1 V.

The collector of the PNP transistor Tr10 is connected to a first input of a differential amplifier 22 with a resistor R11 therebetween. A second input of the differential amplifier 22 is connected to a power supply 17 that outputs a reference voltage. A reference voltage of 1 V is output. The output and the first input of the differential amplifier 22 are connected to a capacitor C10 and function as an integration circuit segment. The output of the differential amplifier 22 may be input to an amplifier 14 with a gain of −K. The output of the amplifier 14 is connected to the base of an NPN transistor Tr11. The emitter of the NPN transistor Tr11 is grounded, and the collector of the NPN transistor Tr11 is connected to the collector of the PNP transistor Tr10. The differential amplifier 22, the power supply 17, the amplifier 14, the resistor R11, the capacitor C10, and the NPN transistor Tr11 function as a first constant-current output bias circuit unit.

The collector of the NPN transistor Tr13 is connected to a first input of a differential amplifier 24 with a resistor R12 therebetween. A second input of the differential amplifier 24 is connected to a power supply 16 that outputs a reference voltage. A reference voltage that is 1 V less than the voltage of the power supply Vcc is output. The output and the first input of the differential amplifier 24 are connected to a capacitor C11 and function as an integration circuit segment. The output of the differential amplifier 24 may be input to an amplifier 15 having a gain of −K. The output of the amplifier 15 is connected to the base of a PNP transistor Tr12. The emitter of the PNP transistor Tr12 is connected to the power supply (as indicated by arrow A in FIG. 2), and the collector of the PNP transistor Tr12 is connected to the collector of the NPN transistor Tr13. The differential amplifier 24, the power supply 16, the amplifier 15, the resistor R12, the capacitor C11, and the PNP transistor Tr12 function as a second constant-current output bias circuit unit.

Accordingly, the drive source circuit segment and the drive sink circuit segment function as a complementary constant-current drive circuit unit. Also, the output of the drive source circuit segment is connected to the sensor coil 10 through the DC coupling capacitor C14 and to the first constant-current output bias circuit unit, and the output of the drive sink circuit segment is connected to the sensor coil 10 through the DC coupling capacitor C13 and to the second constant-current output bias circuit unit. Such individually provided constant-current output bias circuit units allow the bias voltage of the output of each drive circuit to be maintained at a midpoint potential of an operating voltage range and a drive voltage range to be extended.

Although the bipolar transistor is described above as having a PNP transistor and an NPN transistor, it should be understood that FETs or other elements corresponding to the bipolar transistor may also be used in the present invention. Furthermore, the drive circuit unit, functioning as a drive source circuit segment and a drive sink circuit segment, is not limited to a particular circuit system.

It will be apparent to one of ordinary skill in the art that various modifications and variations can be made in the construction or configuration of the present invention without departing from the scope or spirit of the invention. Therefore, it is intended that the present invention cover all such modifications and variations of the invention, provided they come within the scope of the following claims and their equivalents.

What is claimed is:

1. A low-voltage drive circuit for driving a sensor coil in a coordinate input device at a constant current, comprising:
   a constant-current output drive circuit unit;
   a DC coupling capacitor provided between an output of said constant-current output drive circuit unit and a sensor coil; and
   a constant-current output bias circuit unit for controlling a DC bias voltage of the output of said constant-current output drive circuit unit to be a midpoint potential of an operating voltage range for said constant-current output drive circuit unit.

2. The low-voltage drive circuit of claim 1, wherein said constant-current output bias circuit unit of claim 1 comprises a differential amplifier, one of a PNP transistor and a Pchannel FET, one of an NPN transistor and an Nchannel FET, a plurality of resistors, a capacitor, and a plurality of power supplies.

3. The low-voltage drive circuit of claim 1, wherein said constant-current output drive circuit unit includes a drive source circuit segment and a drive sink circuit segment that function as a complementary constant-current circuit unit.

4. The low-voltage drive circuit of claim 3, wherein said drive source circuit segment comprises a differential amplifier and one of a PNP transistor and a Pchannel FET.

5. The low-voltage drive circuit of claim 3, wherein said drive sink circuit segment comprises a differential amplifier and one of a NPN transistor and an Nchannel FET.

6. A low-voltage drive circuit for driving a sensor coil in a coordinate input device at a constant current, comprising:
   a constant-current output drive source circuit segment;
   a first DC coupling capacitor provided between an output of said drive source circuit segment and a sensor coil;
   a first constant-current output bias circuit unit for controlling a DC bias voltage of the output of said drive source circuit segment to be a midpoint potential of an operating voltage range for said drive source circuit segment;
   a constant-current output drive sink circuit segment, said drive sink circuit segment functioning as a complementary constant-current circuit unit together with said drive source circuit segment;
   a second DC coupling capacitor provided between an output of said drive sink circuit segment and said sensor coil; and
   a second constant-current output bias circuit unit for controlling the DC bias voltage of the output of said drive sink circuit segment to be a midpoint potential of an operating voltage range for the drive sink circuit segment.

7. The low-voltage drive circuit of claim 6, wherein said first constant-current output bias circuit unit comprises a differential amplifier, a power supply, an amplifier, a resistor, a capacitor, and one of an NPN transistor and an Nchannel FET.

8. The low-voltage drive circuit of claim 6, wherein said second constant-current output bias circuit unit comprises a differential amplifier, a power supply, a resistor, a capacitor, and one of a PNP transistor and a Pchannel FET.

9. The low-voltage drive circuit of claim 6, wherein said drive source circuit segment comprises a differential amplifier and one of a PNP transistor and a Pchannel FET.

10. The low-voltage drive circuit of claim 6, wherein said drive sink circuit segment comprises a differential amplifier and one of a NPN transistor and an Nchannel FET.

11. A low-voltage drive method for driving a sensor coil in a coordinate input device at a constant current, comprising the steps of:
    providing a constant-current output drive circuit unit;
    connecting a DC coupling capacitor between an output of the constant-current output drive circuit unit and a sensor coil; and
    controlling a DC bias voltage of the output of the constant-current output drive circuit unit to be a midpoint potential of an operating voltage range for the constant-current output drive circuit unit by a constant-current output bias circuit unit.

12. The low-voltage drive method of claim 11, including the step of connecting a ground to the sensor coil.

13. The low-voltage drive method of claim 11, including the further step of transmitting an AC signal to the sensor coil.

14. A low-voltage drive method for driving a sensor coil in a coordinate input device at a constant current, comprising the steps of:
    providing a constant-current output drive source circuit segment;
    connecting a first DC coupling capacitor between an output of the drive source circuit segment and a sensor coil;
    controlling a DC bias voltage of the output of the drive source circuit segment to be a midpoint potential of an operating voltage range for the drive source circuit segment by a first constant-current output bias circuit unit;
    providing a constant-current output drive sink circuit segment, the drive sink circuit segment functioning as a complementary constant-current circuit unit together with the drive source circuit segment;
    connecting a second DC coupling capacitor between an output of the drive sink circuit segment and the sensor coil; and
    controlling a DC bias voltage of the output of the drive sink circuit segment to be a midpoint potential of an operating voltage range for the drive sink circuit segment by a second constant-current output bias circuit unit.

15. The low-voltage drive method of claim 14, including the step of connecting a ground to the sensor coil.

16. The low-voltage drive method of claim 14, including the further step of transmitting an AC signal to the sensor coil.

* * * * *